United States Patent [19]
Muller et al.

[11] 3,718,641
[45] Feb. 27, 1973

[54] REACTIVE ARYLAZO-PYRAZOLONE DYESTUFFS

[75] Inventors: Rolf Muller, Frankfurt am Main; Hanswilli von Brachel, Offenbach am Main; Rudolf Klein, Frankfurt am Main-Fechenheim; Ewald Schmidt, Bischofsheim; Heinz Bender, Bergen-Enkheim, all of Germany

[73] Assignee: Cassella Farbwerke Mainkur AG, Frankfurt, Germany

[22] Filed: May 4, 1970

[21] Appl. No.: 34,604

[30] Foreign Application Priority Data

May 6, 1969  Germany.....................P 19 22 940.4

[52] U.S. Cl. .........................260/162, 8/50, 8/51, 260/147, 260/153, 260/154, 260/158, 260/160, 260/163

[51] Int. Cl. ......................C09b 62/70, C09b 62/82
[58] Field of Search......................260/162, 163, 147

[56] References Cited
UNITED STATES PATENTS 3,435,023   3/1969   Meininger et al. ...................260/163

*Primary Examiner*—Floyd D. Higel
*Attorney*—Connolly & Hutz

[57] ABSTRACT

Dyestuff of the formula

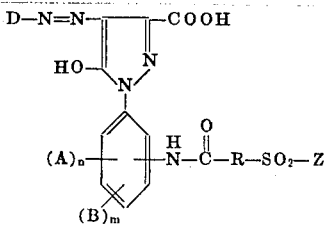

wherein D is the residue of a diazo component; A, B and Z are substituent moieties; $m$ and $n$ are integers and R is a hydrocarbon bridging member as well as the copper, cobalt and chromium metal complexes thereof, which are useful for dyeing wool, polyamide, silk or cellulose fibers in good dye yields having highly brilliant greenish to reddish yellow shados possessing good fastness properties.

7 Claims, No Drawings

REACTIVE ARYLAZO-PYRAZOLONE DYESTUFFS

The present invention relates to azo dyestuffs of the pyrazolone series of the general formula

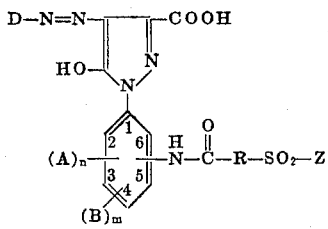

wherein D is the residue of a diazo component;
A is halogen, alkyl having one to four carbon atoms, alkoxy having one to four carbon atoms, phenylamino, phenoxy, substituted phenylamino or substitued phenoxy, said substituents being halogen or alkyl having one to four carbon atoms;
B is —SO$_3$H or —COOH;
$n$ is 1, 2 or 3;
$m$ is 0 or 1;
$n + m$ is an integer of from 1 to 4;
R is alkylene containing from one to eight carbon atoms, phenylene, cyclohexylene, endomethylenecyclohexylene or endoethylenecyclohexylene.

as well as the metal complexes of these dyestuffs.

Those dyestuffs wherein $n$ and $m$ are one, the substituent A is in the 2-position, the substituent B is in the 3-position and the acylamino group is in the 5-position of the phenyl nucleus of the azo component are particularly preferred.

The preferred diazo components of the present invention include those of the aminobenzene, aminonaphthalene, aminodiphenyl, aminoazobenzene, aminophenylazonaphthalene, aminothiazole and the aminobenzthiazole series. Particularly preferred D moieties embrace phenyl, naphthyl, diphenylene, azophenyl, phenyleneazonaphthalene, thiazolyl, benzthiazolyl and said radicals having one or more substituents selected from the group consisting of —SO$_3$H, —COOH, chloro, bromo, hydroxy, alkyl containing one to four carbon atoms, alkoxy containing one to four carbon atoms, nitro, acetylamino, β-chloropropionylamino, acetylalkylamino containing three to six carbon atoms, chloro-1,3,5-triazinylamino, 2,3-dichloro-quinoxaline-6-carboxylamino, trichloropyrimidinylamino and β-sulfatoethylsulfonyl.

Typical examples of the diazo components according to the present invention include: aminobenzenes, aminobenzene sulfonic acids, aminobenzene disulfonic acids, aminobenzene carboxylic acids, aminobenzene dicarboxylic acids, aminobenzene sulfonic acid carboxylic acids, aminophenol sulfonic acid, aminonaphthalenesulfonic acids, aminonaphthalene disulfonic acids, aminonaphthalene trisulfonic acids, aminonaphthol sulfonic acids, aminonaphthalene carboxylic acids, aminonaphthalene sulfonic acid carboxylic acids, aminodiphenyl sulfonic acids, aminodiphenyl carboxylic acids, aminodiphenyl disulfonic acids, aminoazobenzene sulfonic acids, aminoazobenzene carboxylic acids, aminophenylazonaphthalene sulfonic acids, aminobenzthiazole as well as aminobenzthiazole sulfonic acids. These components may also bear substituents customary in the azo chemistry, such as chlorine, bromine, hydroxy, alkyl containing one to four carbon atoms, alkoxy containing one to four carbon atoms, nitro, acetylamino, β-chloropropionylamino, acetylalkylamino containing from three to six carbon atoms or chloro-1,3,5-triazinylamino, 2,3-dichloro-quinoxaline-6-carboxylamino, trichloropyrimidinylamino.

Further typical diazo components are those bearing an additional reactive residue, such as 4-aminophenyl-β-sulfatoethylsulfone, 3-aminophenyl-β-sulfatoethylsulfone, 2-methoxy-4-amino-phenyl-β-sulfatoethylsulfone, 2-sulfo-4-aminophenyl-β -sulfatoethylsulfone as well as the condensation products prepared from aromatic diamines and derivatives, for instance, acid chlorides, of those acids containing themselves an additional residue capable of reacting with the fibers, such as the condensation product made from 1,4-phenylenediamine-2-sulfonic acid and cyanuric chloride, the condensation product made from 1,3-phenylene-diamine-4-sulfonic acid and acrylic acid chloride or the condensation product made from 1,4-phenylene-diamine-2,5-disulfonic acid and β-chloroethylsulfonyl-endomethylenecyclo-hexane-carboxylic acid chloride.

Further typical diazo components are those bearing themselves an azo group, such as 2-(4'-aminophenyl)-azo-naphthalene-4,6,8-trisulfonic acid or 2-(2'-methyl-4'-aminophenyl)-azo-naphthalene-3,6,8-trisulfonic acid.

The residue R may be, for instance, the ethylene, butylene, phenylene, cyclohexylene, endomethylenecyclohexylene or the endoethylenecyclohexylene residue.

The dyestuffs of the present invention are obtained by reacting dyestuffs of the general formula

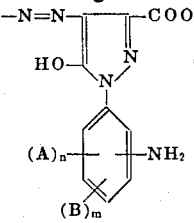

or, if the residue of the diazo component D bears in the o-position to the azo bridge a group capable of forming a complex salt, the metal complexes of these dyestuffs with reactive derivatives of an acid of the general formula

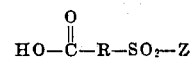

The acid chlorides thereof are illustrative of suitable derivatives.

The dyestuffs of the present invention are useful reactive dyestuffs for the dyeing and printing of wool, polyamide and silk. They are particularly useful, if alkaline agents are used, for the dyeing and printing of cellulose and regenerated cellulose. They obtain particularly good dye yields, especially if they are applied according to the so-called two-step process. The thusly obtained greenish to reddish yellow shades are of high brilliancy and have good to excellent fastness properties.

As compared with the dyestuffs described in German document laid open to public inspection No.

1,066,302, Example 1, which contains instead of the residue of the acid III the residue of the cyanuric chloride, as well as compared with the dyestuff described in German document laid open to public inspection No. 1,111,753, Example 15, which contains the residue of the β-chloropropionic acid as reactive component, the dyestuffs of the present invention have the advantage of being universally applicable according to the two-step-process.

Unlike the corresponding dyestuffs of British specification No. 1,144,966 (page 13, table 2) the dyestuffs of the present invention distinguish themselves by a greater brilliancy. Moreover, their preparation requires a substantially smaller excess of acylating agents.

The following examples are given for the purpose of illustrating the present invention. All temperatures are given in degrees centigrade.

EXAMPLE 1

*a.* 221 g. aniline-2,5-disulfonic acid are diazotized in the usual manner and coupled onto 233 g. 1-(2'-methyl-5'-aminophenyl)-pyrazolone-3-carboxylic acid. The thusly obtained dyestuff is separated by salting out or acidify-ing to a pH-value of 2 and isolated as usual. The dyestuff is again dissolved neutral by the addition of 9000 c.c. water, admixed with 92 g. sodium bicarbonate and acylated at 10°–15° with 312 g. β-chloroethylsulfonyl-endomethylene-cyclohexane-carboxylic acid chloride (preparation according to British Patent specification No. 1,144,966, Example 1). If the dyestuff is no longer diazotizable, it is precipitated by the addition of potassium chloride and vacuum-dried at 60°.

*b.* Cotton yarn is dyed at 40° during 1 hour with 2 percent of the dyestuff, 40 g./l. Glauber's salt and 10 g./l. calcined sodium carbonate at a liquor ratio of 1:20. Obtained is a yellow dye-ing having a good fastness to light.

Equally valuable reactive dyes are obtained if the diazo and coupling components enumerated in the following table are employed whereas apart from that the working is carried out as described hereinbefore.

| Diazo Component | Coupling Component | Shade on Cotton |
|---|---|---|
| aniline-2,4-disulfonic acid | 1-(2'-methyl-5'-amino-phenyl)-pyrazolone-3-carboxylic acid | yellow |
| aniline-2,4-dicarboxylic acid | " | " |
| aniline-4-sulfonic acid-2-carboxylic acid | " | " |
| aniline-2-sulfonic acid | " | " |
| aniline-2-carboxylic acid | " | " |
| aniline-3-carboxylic acid | " | " |
| aniline-4-carboxylic acid | " | " |
| aniline-3-sulfonic acid | " | " |
| aniline-4-sulfonic acid | " | " |
| 2-naphthylamine-1,5-disulfonic acid | 1-(2'-methyl-5'-amino-phenyl)-pyrazolone-3-carboxylic acid | yellow |
| 2-naphthylamine-4,8-disulfonic acid | " | " |
| 2-naphthylamine-6,8-disulfonic acid | 1-(2'-methyl-4'-amino-phenyl)-pyrazolone-3-carboxylic acid | " |
| 1-naphthylamine-2,5-disulfonic acid | 1-(2'-methyl-3'-amino-phenyl)-pyrazolone-3-carboxylic acid | " |
| 2-naphthylamine-3,6,8-trisulfonic acid | 1-(2'-methoxy-5'-amino-phenyl)-pyrazolone-3-carboxylic acid | " |
| 4-aminoanisole-3-sulfonic acid | 1-(2'-methoxy-5'-amino-phenyl)-pyrazolone-3-carboxylic acid | " |
| 2-chloroaniline-4-sulfonic acid | 1-(4'-chloro-3'-amino-phenyl)-pyrazolone-3-carboxylic acid | " |

EXAMPLE 2

*a.* 173 g. aniline-o-sulfonic acid are diazotized in the usual manner and coupled at a pH value of 5-6 onto 331 g. 1-(2'-methyl-3'-sulfo-5'-aminophenyl)-pyrazolone-3-carboxylic acid. At a pH-value of 1 the dyestuff is separated and dissolved in 3000 c.c. water at a pH value adjusted to 7,5 by the addition of aqueous sodium hydroxide solution. First 110 g. sodium bicarbonate and then 330 g. β-chloroethylsulfonyl-cyclohexane-carboxylic acid chloride dissolved in 300 g. ethylene chloride are added. Stirring is continued until there are only tracee of the initial dyestuff detectable in the chromatogram. Subsequently, the dyestuff is precipitated with common salt and vacuum-dried at 60°.

*b.* A fabric on the basis of regenerated cellulose is printed with the following printing paste:

| 50 g. | of the dye obtained as described above |
| 100 g. | urea |
| 390 g. | hot water |
| 450 g. | alginate thickener |
| 10 g. | sodium-m-nitrobenzenesulfonate |
| 1,000 g. | TOTAL |

After printing and drying the fabric is padded with

| 30 g. | aqueous sodium hydroxide solution of 38°Be |
| 150 g. | soda |
| 50 g. | potassium carbonate |
| 100 g. | common salt |
| | water |
| 1000 g. | TOTAL | and immediately steamed during 30 seconds at 120°.

After rinsing and soaping one obtains a clear greenish yellow print having good fastness properties.

Similarly good results are obtained if printing pastes are employed that contain the dyestuff together with the alkaline agent. For instance a fabric on the basis of alkalized or mercerized cotton is printed with the following printing paste:

50 g. of the dye obtained as described above
50 g. urea
410 g. hot water
450 g. alginate thickener
30 g. sodium bicarbonate
10 g. sodium-m-nitrobenzenesulfonate.

After printing and drying the fabric is steamed for approx. 5 minutes at 100°–105°, rinsed and washed.

A similar result is obtained if the fixation is performed by dry-heating, for instance, during 5 minutes at 140°–150°.

Equally valuable dyes are obtained if instead of the above-mentioned acid chloride the following compounds are employed:

β-chloroethylsulfonyl-endomethylenecyclohexane-carboxylic acid chloride,

β-chloroethylsulfonyl-endoethylenecyclohexane-carboxylic acid chloride,

4-β-chloroethylsulfonyl benzoyl chloride,
3-β-chloroethylsulfonyl benzoyl chloride,
2-β-chloroethylsulfonyl benzoyl chloride,
3-β-chloroethylsulfonyl butyroyl chloride,
γ-vinylsulfonyl butyroyl chloride,
β-bromoethylsulfonyl-endomethylenecyclohexane-carboxylic acid bromide.

EXAMPLE 3

525 g. of the azo dyestuff made from diazotized 2-aminophenol-4-sulfonic acid and 1-(2'-ethyl-3'-amino-5'-sulfophenyl)-pyrazolone-3-carboxylic acid are converted in the usual manner into the copper complex. At a $p_H$ value of 7,2 the complex being formed is dissolved in 2,5 l water, admixed with 200 g. sodium bicarbonate and 347 g. 3-β-chloroethylsulfonylbenzoyl chloride, dissolved in 700 c.c. acetone, and stirred until the dyestuff is no longer diazotizable. Subsequently, it is precipitated by the addition of potassium chloride and vacuum-dried at 65°. Obtained is a yellowish brown dyestuff having good fastness properties.

The following table indicates further components yielding valuable dyes if they are employed according to the above Example:

| Diazo Component | Azo Component | Heavy Metal | Shade on cotton |
|---|---|---|---|
| 2-aminophenol-5-sulfonic acid | 1-(2'-methyl-5'-amino-phenyl)-pyrazolone-3-carboxylic acid | Cr | reddish brown |
| 2-aminophenol-4,6-disulfonic acid | 1-(2'-chloro-3'-amino-5'-sulfophenyl)-pyrazolone-3-carboxylic acid | Co | |
| 2-naphthylamine-4,8-disulfonic acid | 1-(2'-ethoxy-3'-sulfo-5'-aminophenyl)-pyrazolone-3-carboxylic acid | Cu | brown |
| (dyestuff subsequently coppered in the presence of $H_2O_2$) | | | |
| 2-(2'-methyl-4'-amino-5'-methoxy-phenyl)-azonaphtha-lene-4,8-disulfonic acid | 1-(2'-methyl-3'-sulfo-5'-aminophenyl)-pyrazol-one-3-carboxylic acid | Cu | violet |
| (dyestuff subsequently coppered in the presence of $CuSO_4$) | | | |
| 1-amino-2-naphthol-4-sulfonic acid | 1-(2',6'-dimethyl-3'-sulfo-5'-amino-phenyl)-pyrazolone-3-carboxylic acid | Co | brown |
| 2-aminophenol-4-sulfonic acid | 1-(2',4',6'-trimethyl-3'-sulfo-5'-aminophenyl)-pyrazolone-3-carboxylic acid | Cr | reddish brown |

EXAMPLE 4

223 g. 2-naphthylamine-1-sulfonic acid are diazotized in the usual manner and coupled at a $p_H$ value of 5–6 onto 329 g. 1-(2'-methoxy-3'-sulfo-5'-aminophenyl)-pyrazolone-3-carboxylic acid. The dyestuff solution is adjusted to a $p_H$ value of 7,5, admixed with 100 g. sodium bicarbonate and 1000 g. ethylene chloride and then stirred with 256 g. 3-β-chloroethylsulfonyl butyroyl chloride until the dyestuff is no longer diazotizable. Subsequently, it is precipitated by the addition of common salt and vacuum-dried at 70°.

A fabric on the basis of alkalized or mercerized cotton is printed with the following printing paste:

50 g. of the dye obtained as described above
100 g. urea
390 g. hot water
450 g. alginate thickener
10 g. sodium salt of the m-nitrobenzoylsulfonic acid.

After printing and drying the fabric is padded with

| 100 g. | aqueous sodium hydroxide solution of 38°Bé |
| 150 g. | soda |
| 50 g. | potassium carbonate |
| 100 g. | common salt |
| | water |
| 1,000 g. | TOTAL |

The fixation is performed by storing the fabric during 3–5 hours at room temperature. After rinsing and soaping one obtains a clear yellow print having good fastness properties. An equally good fixation is obtained by padding with the above lye at 98° and rinsing and soaping the fabric immediately afterwards.

By employing the following diazo and coupling components and working apart from that as described hereinbefore, one also obtains valuable dyestuffs:

| Diazo Component | Azo Component | Shade on Cotton |
|---|---|---|
| 2-naphthylamine-5-sulfonic acid | 1-(2'-methyl-3'-sulfo-5'-aminophenyl)-pyrazolone-3-carboxylic acid | yellow |
| 2-naphthylamine-7-sulfonic acid | " | " |
| 2-naphthylamine-1,5-disulfonic acid | " | " |
| 2-naphthylamine-3,6-disulfonic acid | 1-(2'-phenoxy-3'-sulfo-5'-aminophenyl)-pyrazolone-3-carboxylic acid | " |
| 2-naphthylamine-5,7-disulfonic acid | 1-(2'-methoxy-3'-sulfo-5'-aminophenyl)-pyrazolone-3-carboxylic acid | " |
| 2-naphthylamine-4,8-disulfonic acid | 1-(2'-methoxy-3'-sulfo-5'-aminophenyl)-pyrazolone-3-carboxylic acid | yellow |
| 2-naphthylamine-3,6,8-trisulfonic acid | 1-(2',4'6'-trimethyl-3'-sulfo-5'-aminophenyl)-pyrazolone-3-carboxylic acid | " |
| 2-naphthylamine-4,6,8-trisulfonic acid | " | " |
| 6-nitro-2-naphthyl-amine-4,8-disulfonic acid | 1-(2'-methyl-3'sulfo-5'-aminophenyl)-pyrazolone-3-carboxylic acid | " |
| 6-acetamino-2-naphthylamine-4,8-disulfonic acid | " | " |
| 1-naphthylamine-2-sulfonic acid | " | " |
| 1-naphthylamine-4-sulfonic acid | " | " |
| 1-naphthylamine-5-sulfonic acid | 1-(2'-ethoxy-3'-sulfo-5'-aminophenyl)-pyrazolone-3-carboxylic acid | " |

| | | |
|---|---|---|
| 1-naphthylamine-6-sulfonic acid | 1-(2'-phenoxy-3'-sulfo-5'-aminophenyl)-pyrazolone-3-carboxylic acid | " |
| 1-naphthylamine-8-sulfonic acid | 1-(2'-methyl-3'-amino-5'-sulfophenyl)-pyrazolone-3-carboxylic acid | " |
| 1-napthylamine-2,5-disulfonic acid | " | " |
| 1-naphthylamine-6,8-disulfonic acid | " | " |
| 1-naphthylamine-2,4,7-trisulfonic acid | 1-(2'-phenoxy-3'-amino-5'-sulfophenyl)-pyrazolone-3-carboxylic acid | yellow |
| 1-naphthylamine-3,6,8-trisulfonic acid | " | " |
| aniline | 1-(2'-methyl-3'-amino-5'-sulfophenyl)-pyrazolone-3-carbonsaure | " |
| o-toluidine | " | " |
| p-bromoaniline | " | " |
| 2,5-dichloroaniline | 1-(2'-methoxy-3'-amino-5'-sulfophenyl)-pyrazolone-3-carboxylic acid | " |
| p-anisidine | " | " |
| aniline-2-sulfonic acid | " | " |
| aniline-3-sulfonic acid | 1-(3'-methyl-2'-sulfo-5'-aminophenyl)-pyrazolone-3-carboxylic acid | " |
| aniline-4-sulfonic acid | 1-(2'-phenylamino-3'-sulfo-5'-aminophenyl)-pyrazolone-3-carboxylic acid | " |
| aniline-2,5-disulfonic acid | 1-(2'-phenoxy-3'-sulfo-5'-aminophenyl)-pyrazolone-3-carboxylic acid | " |
| 4-chloroaniline-2-sulfonic acid | 1-(2'-isopropyl-3'-amino-5'-carboxyphenyl)-pyrazolone-3-carboxylic acid | " |
| 2-chloroaniline-4-sulfonic acid | 1-(2'-methoxy-3'-amino-5'-carboxyphenyl)-pyrazolone-3-carboxylic acid | " |
| 4-methoxyaniline-2-sulfonic acid | 1-(2'-chloro-3'-carboxy-5'-aminophenyl)-pyrazolone-3-carboxylic acid | " |
| 4-aminophenyl-β-sulfato-ethylsulfone | 1-(2'-methyl-3'-sulfo-5'-aminophenyl)-pyrazolone-3-carboxylic acid | yellow |
| 3-aminophenyl-β-sulfato-ethylsulfone | " | " |
| 2-methoxy-4-aminophenyl-β-sulfatoethylsulfone | " | " |
| 4-N-methyl-N-acetylamino-aniline-2-sulfonic acid | " | " |
| 4-acetamino-aniline-2-sulfonic acid | " | " |
| 3-β-chloropropionylamino-aniline-2-sulfonic acid | " | " |
| condensation product from p-phenylenediamine-sulfonic acid, cyanuric chloride and sulfanilic acid | " | " |
| condensation product from p-phenylenediamine-sulfonic acid and 2,3-dichloro-quinoxaline-6-carboxylic chloride | " | " |
| condensation product from m-phenylenediamine-sulfonic acid and tetrachloro pyrimidine | " | " |
| 4-amino-azobenzene-disulfonic acid-3,4' | " | " |
| 1-amino-4-phenylazo-naphtha-lene-6-sulfonic acid | " | " |
| 5-nitro-2-aminothiazole | " | orange |
| 6-sulfo-2-aminobenzthiazole | " | " |
| 2-(2'-methyl-4'-amino-5'-methoxyphenyl)-azonaphthalene-4,8-disulfonic acid | " | red |

We claim:

1. A dyestuff selected from the group consisting of those of the formula

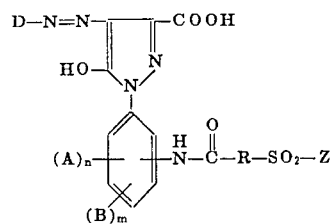

and the copper, cobalt and chromium metal complexes thereof wherein D is selected from the group consisting of phenyl, naphthyl, diphenylene and said radicals having one or more substituents selected from the group consisting of —SO₃H, —COOH, chloro, bromo, hydroxy, alkyl containing one to four carbon atoms, alkoxy containing one to four carbon atoms, nitro, acetylamino, β-chloropropionylamino, acetylalkylamino containing three to six carbon atoms and β-sulfatoethylsulfonyl; A is halogen, alkyl having one to four carbon atoms, alkoxy having one to four carbon atoms, phenylamino, phenoxy, substituted phenylamino or substituted phenoxy, said substituents being halogen or alkyl having one to four carbon atoms; B is —SO₃H or —COOH; n is 1, 2 or 3; m is 0 or 1; m + n is an integer of from one to four and R is alkylene having 1 to 8 carbon atoms, phenylene, cyclohexylene, endomethylenecyclohexylene or endoethylenecyclohexylene and Z is vinyl or —CH₂—CH₂—X wherein X is halogen or —SO₃H.

2. The dyestuff of claim 1 wherein n and m are each 1, A is a 2-position substituent, B is a 3-position substituent and

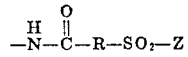

is a 5-position substituent.

3. The dyestuff of claim 1 wherein said D is substituted with —COOH, —SO₃H or both of these moieties.

4. The dyestuff of claim 1 wherein D is 2,5-disulfophenyl, n is 1 and A is 2-methyl, m is zero, the acylamino group is a 5-position substituent, R is endomethylenecyclohexylene and Z is β-chloroethyl.

5. The dyestuff of claim 1 wherein D is o-sulfo-phenyl, n and m are each 1, A is 2-methyl, B is 3-sulfo, the acylamino group is a 5-position substituent, R is cyclohexylene and Z is β-chloroethyl.

6. The dyestuff of claim 1 wherein D is 3-sulfo-6-hydroxyphenyl, n and m are each 1, A is 2-ethyl, B is 5-sulfo, the acylamino group is a 3-position substituent, R is phenylene and Z is β-chloroethyl.

7. The dyestuff of claim 1 wherein D is 2-sulfonaphthyl, n and m are each 1, A is 2-methoxy, B is 3-sulfo, the acylamino group is a 5-position substituent, R is propylene and Z is β-chloroethyl.

* * * * *